United States Patent [19]
Petzetaris

[11] 3,751,197
[45] Aug. 7, 1973

[54] APPARATUS FOR PRODUCTION OF POLYMERIC FOAM

[75] Inventor: Nicholas George Petzetaris, Athens, Greece

[73] Assignee: Hellenic Plastics and Rubber Industry N. M. Pelzetakis, S. A., Athens, Greece

[22] Filed: Jan. 26, 1971

[21] Appl. No.: 109,906

Related U.S. Application Data

[63] Continuation-in-part of Ser. No. 867,218, Oct. 17, 1969, Pat. No. 3,719,734, which is a continuation-in-part of Ser. No. 738,962, June 21, 1968, abandoned, which is a continuation-in-part of Ser. No. 591,550, Nov. 2, 1966, abandoned.

[52] U.S. Cl. .................................. 425/4, 264/47
[51] Int. Cl. ............................................. B29d 27/04
[58] Field of Search .................... 425/4, 817; 264/47

[56] References Cited
UNITED STATES PATENTS

| | | | |
|---|---|---|---|
| 3,091,811 | 6/1963 | Hackert | 425/4 C X |
| 3,596,313 | 8/1971 | Darmochwal et al. | 425/4 C X |

FOREIGN PATENTS OR APPLICATIONS

| | | | |
|---|---|---|---|
| 1,912,576 | 10/1970 | Germany | 264/47 |

Primary Examiner—H. A. Kilby, Jr.
Attorney—Cushman, Darby & Cushman

[57] ABSTRACT

Apparatus for producing polymeric foam blocks (known as "buns") with a substantially flat upper surface. A mixture of, e.g. polyurethane, foam-forming reactants is moved along a trough-shaped conveyor where the reactants are confined during foaming by side and bottom surfaces moving with the expanding foam material. The side surfaces of the conveyor include thin flexible lining material which moves downstream with the expanding foam material and is simultaneously moved upwardly in the foaming region along with the rising surface of the foam material so as to maintain the side margins of the upper surface of the foam at substantially the same height as the central portion of the upper surface of the foam. The downstream and upward movement of the lining material is effected by mechanism which is adjustable to compensate for variations in the location and rate of expansion of the foam so as to ensure that the upper surface of the foam is maintained flat.

22 Claims, 14 Drawing Figures

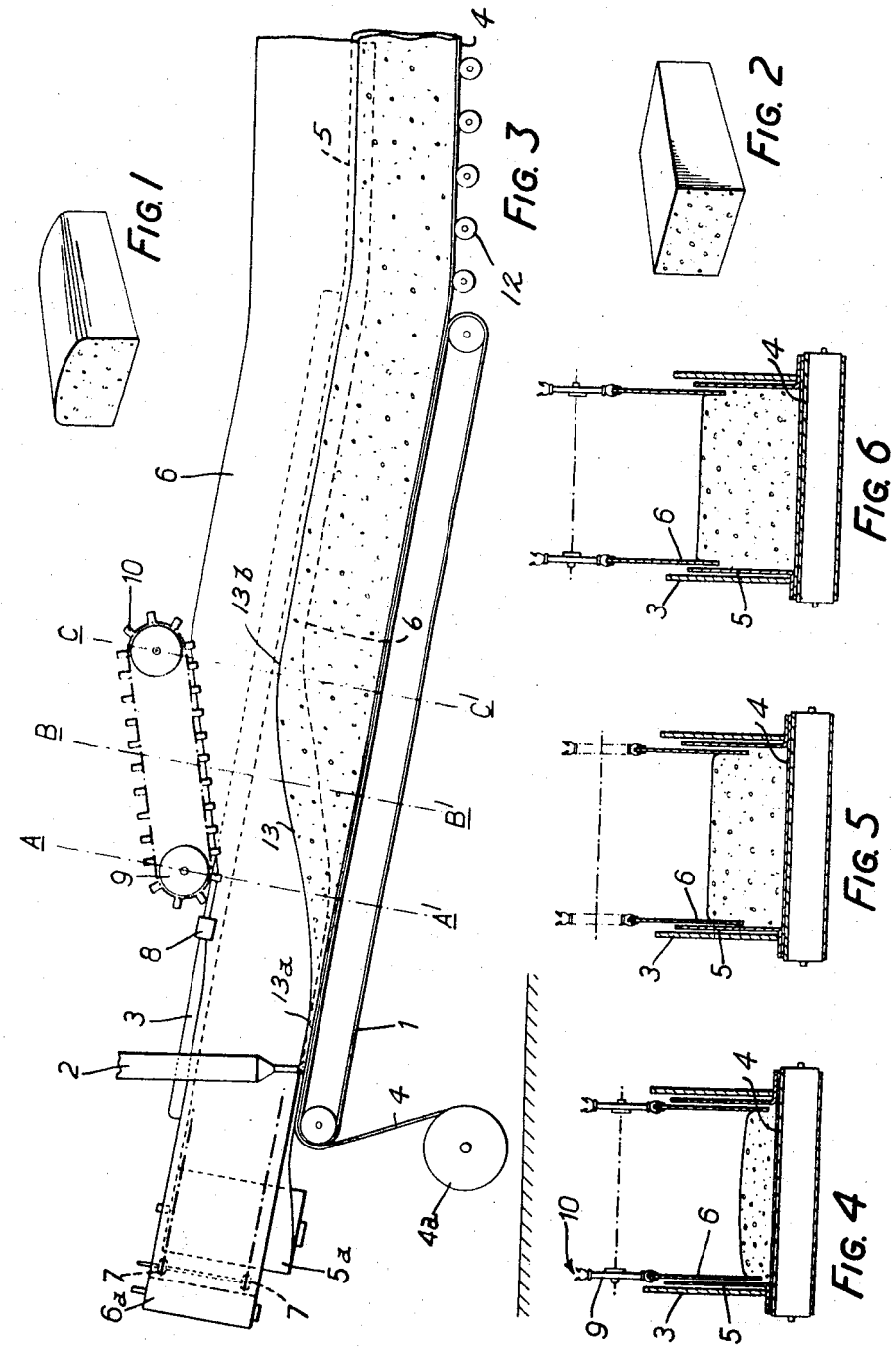

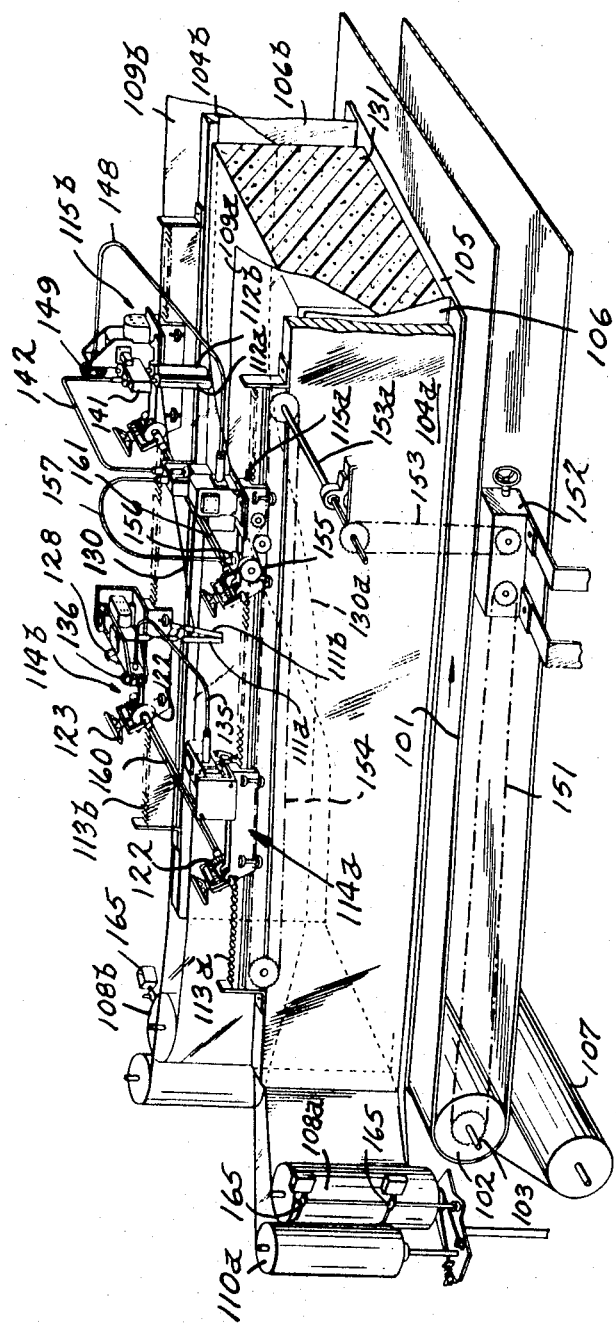

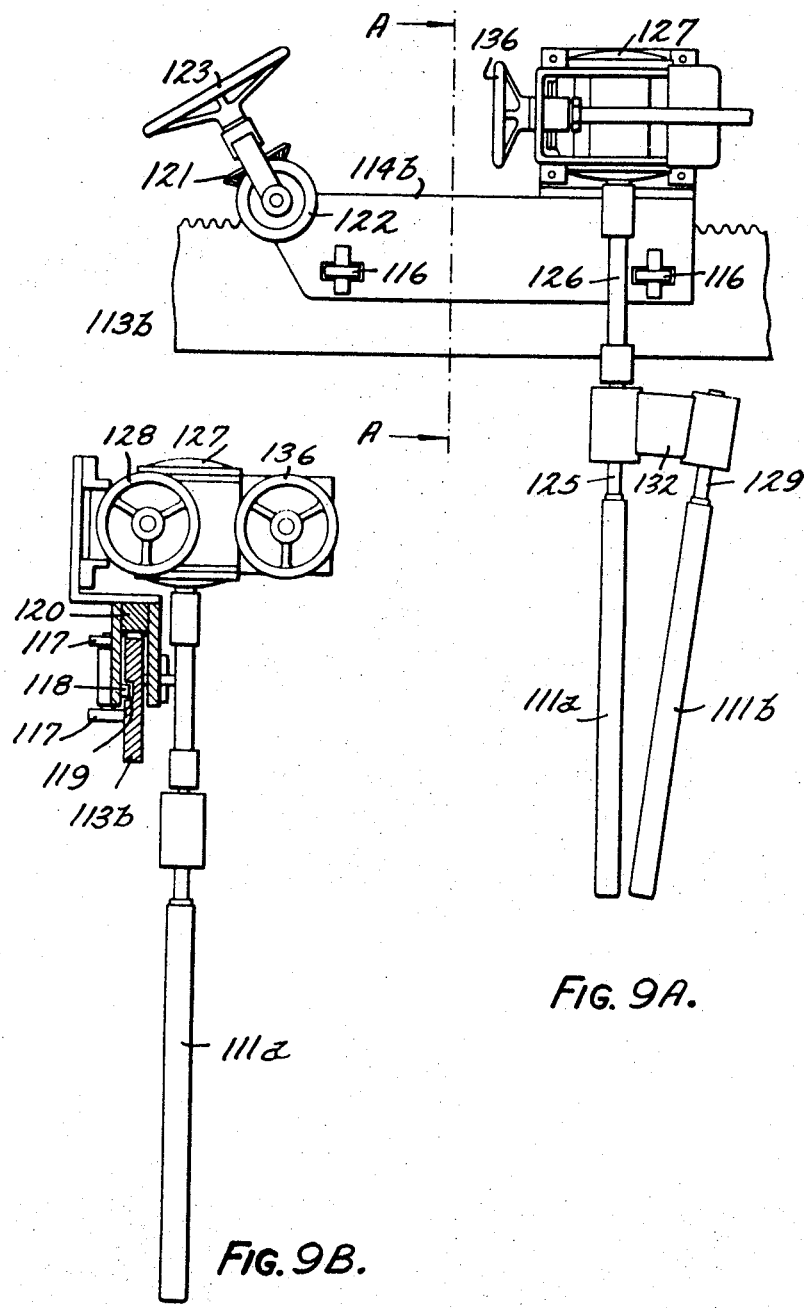

INVENTOR
NICHOLAS GEORGE PETZETAKIS
BY
ATTORNEYS

APPARATUS FOR PRODUCTION OF POLYMERIC FOAM

REFERENCE TO RELATED APPLICATION

This application is a division of my application Ser. No. 867,218 now Pat. No. 3,719,734, filed Oct. 17, 1969, which is a continuation-in-part of application Ser. No. 738,962 now abandoned filed June 21, 1968 which is a continuation-in-part of application Ser. No. 591,550 now abandoned filed Nov. 2, 1966.

A known method for producing polyurethane foam comprises the steps of passing a mixture of appropriate reactants along a conveyor as they react to produce the polyurethane foam and of confining the reactants to the conveyor by means of side surfaces which move along the conveyor with the reactants. Usually, the side surfaces are formed by paper sheets drawn along with the conveyor against fixed and rigid side walls. As the polyurethane foams it rises and, due to interaction between the aforementioned side surfaces and the foam, the top surface of the foam becomes convex as shown in FIG. 1 of the accompanying drawings, which is a perspective view of a foam bun produced according to the known method.

Polyurethane foam is preferably sold in rectangular slabs or sheets having certain standard dimensions. Accordingly, the upper portion of such a known foam bun, bounded by the convex top surface, is not readily salable although this upper portion may constitute between 10 percent and 25 percent by weight of the foam bun.

It has been proposed previously, such as in U.S. Pat. No. 3,091,811, in order to avoid the convex upper surface, to introduce further sheets of paper at the sides of the conveyor between the aforementioned side surface sheets and the foaming polyurethane and to move such further sheets of paper over interposed guide plates, fixed to the aforementioned rigid side walls, upwardly in a fixed direction with respect to the direction in which the foam is being conveyed. This proposal, however, is not satisfactory because, due to variations in ambient conditions and in the starting mixture of chemicals supplied to the conveyor, there is not a consistent pattern in the speed of the upward rising movement of the foam and, also, the position along the conveyor at which the further sheets of paper should commence to move upwardly cannot be determined until foaming actually takes place. Among other disadvantageous factors arising from this previous proposal, difficulties arise in preventing damage to the side walls of the foam.

Another previous proposal for avoiding the formation of a convex top surface is disclosed in U.S. Pat. No. 3,123,856 and involves the insertion of folds in the sheets of paper constituting the side surfaces of the trough conveyor, these folds unfolding to permit the side sheets to be drawn upwardly by the expanding foam. However, it will be appreciated that the ability of the foam to raise the side surfaces or sheets will diminish as the foam expands and will be nonexistent before the foam reaches the limit of its expansion; so that the provision of such folds in the side sheets is not in itself sufficient to ensure flat-topped foam. It is therefore necessary to provide a cover to the trough conveyor in the form of a further lining sheet against which the upper surface of the foam abuts before the expansion energy of the foam has reduced to the point where the foam can no longer raise the side walls. Quite apart from the additional complexity of providing this further lining sheet it is well-known that if the free expansion of the foam is restricted in this way, then the density of the foam will be nonuniform to a degree well beyond normally acceptable limits. It is for this reason that the apparently obvious expedient of forming foam in a simple covered trough, or any method involving the use of a covered trough, is not an acceptable solution to the problem of producing flat-topped foam.

In producing flat-topped foam it is, of course, essential that the desired result be achieved without impairing the quality of the other surfaces of the foam. In other words it would be quite unsatisfactory to produce foam slabs having a flat upper surface if the method or apparatus employed damaged or impaired the quality of the sides or bottom surfaces of the resultant slab. The essential object is to produce blocks of foam having a rectangular cross section, with all four sides plane and it is as important that the sides (or even the base) should define flat planar surfaces as it is that the top surface of the foam define a flat planar surface.

The main object of my invention is the production of polymeric foam by a free-foaming process on a continuous conveyor such that the resultant foam has a rectangular cross section.

A further object is to provide a method and apparatus for producing rectangular sectioned foam continuously on a commercial scale.

Another object is to provide, for producing rectangular sectioned foam, a method which is simple to carry out and an apparatus which is free from unnecessary complexity.

These and other objects are achieved in accordance with the invention by a method of producing polymeric foam from a mixture of reactants, comprising the steps of: passing the reactants along a conveyor as they react and expand to produce the foam; confining the reactants by means of a pair of side surfaces which move along the conveyor with the reactants; introducing between the reactants and each of said side surfaces sheets of thin flexible material; initially moving said sheets of thin flexible material to a first position along the conveyor lying within the region wherein foaming takes place; subsequently moving said sheets downstream of the conveyor from a second position adjacent the downstream end of the foaming region at the same speed as and in a direction parallel to the upper part of the expanded foam, and between the aforesaid first and second positions raising said sheets in contact with the foam along respective inclined paths which are related to the rising level and forward movement of the foam so that there is no or no substantial relative movement between the top surface of the foam and the contiguous surface areas of said sheets; whereby expanded foam is produced with a substantially flat upper surface.

The present invention also provides apparatus for producing polymeric foam from a mixture of reactants comprising in combination: a conveyor arranged to pass the reactants therealong as they react to produce the foam; a pair of continuous side surfaces arranged to move along the conveyor with the foam and confine the foam to the conveyor; continuous sheets of thin flexible material adapted to be disposed between said reactants and each of said side surfaces; means for initially moving each of said sheets to a first position along the conveyor lying within the foaming region, means subsequently to move said sheets downstream of the conveyor from a second position adjacent the downstream end of the foaming region at the same speed as and in a direction parallel to the upper part of the expanded foam, and means for raising said sheets in contact with the foam between the aforesaid first and second positions along respective inclined paths which are related to the rising level and forward movement of the foam so that there is no substantial relative movement between the top surface of the foam and the contiguous surface areas of said sheets; whereby expanded foam is produced with a substantially flat upper surface.

Other objects and the entire scope of the present invention will become apparent from the following detailed description and by reference to the accompanying drawings. It should be understood, however, that the detailed description and specific examples, while indicating preferred embodiments of the invention, are given by way of illustration only, since various changes and modifications within the spirit and scope of the invention will become apparent as the description herein progresses.

Reference is now made to the accompanying drawings which form a part hereof, wherein:

FIG. 1 is as aforementioned a perspective view of a foam bun as produced by the known method and having a convex top surface;

FIG. 2 is a perspective view of a foam bun produced in accordance with the present invention;

FIG. 3 is a side elevational section through a first embodiment of apparatus in accordance with the invention for producing the foam of FIG. 2;

FIG. 4 is a section along the plane A—A$^1$ of FIG. 3;

FIG. 5 is a section along the plane B—B$^1$ of FIG. 3;

FIG. 6 is a section along the plane C—C$^1$ of FIG. 3;

FIG. 7 is a perspective view of a second embodiment of apparatus in accordance with the invention;

FIG. 9A is a side view of one saddle unit of the apparatus of FIG. 7;

FIG. 9B is a cross section on the line A—A of FIG. 9A;

FIG. 11 is a side view of a further saddle unit; and

Figure 8:
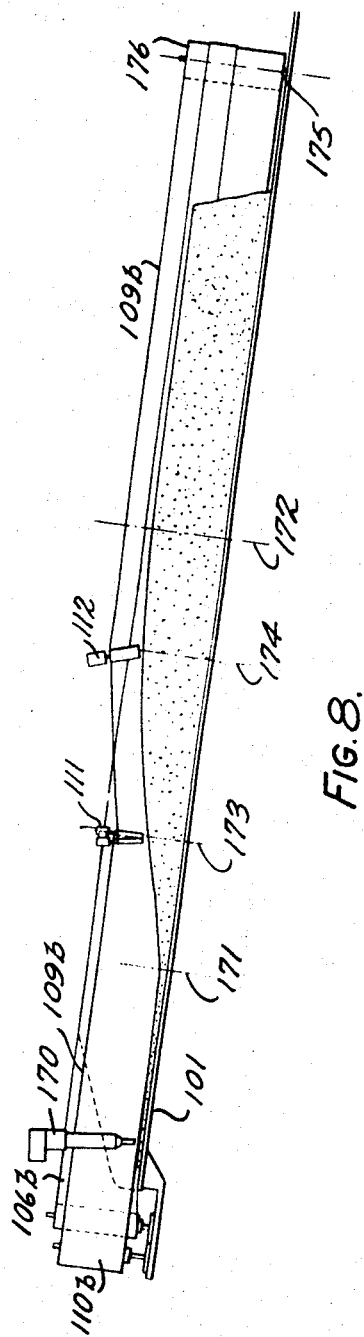
FIG. 8 is a diagrammatic sectional view of a specific production arrangement incorporating the apparatus of FIG. 7.

The apparatus shown in FIGS. 3 to 6 comprises a moving belt conveyor 1. A nozzle 2 is arranged to pour on to the conveyor reactants for forming polyurethane foam. Rigid stationary side walls 3 extend above the conveyor, one adjacent each edge of the conveyor belt.

In order to avoid adherence of the foaming reactants to conveyor 1, there is provided a supply roll 4a of lining paper 4 for lining the conveyor 1 as the conveyor moves along, the lining paper extending under the side walls 3. Idler rollers 12 are provided downstream of the conveyor belt to support the lining paper.

In order to avoid adherence of the material to the side walls 3, there is provided a pair of supply rolls 5a of lining paper 5 (the upper edge of which is shown in broken line), for lining the side walls. The lining papers 5, constituting "side surfaces" as aforementioned, move along the side walls 3 with the foaming reactants.

As is apparent from FIGS. 4 to 6, the lower edge of each lining paper 5 is folded under the adjacent side wall 3 to lie flat against and adhered to the edge of the paper 4 so that the lining papers 4 and 5 together form a trough which is proof against egress of the reacting materials.

It will be noted from FIG. 3 that the reactants start to foam soon after leaving the nozzle 2 and the foam top surface, indicated by the full line 13, rises from a point 13a to a point 13b after which the fully expanded foam continues down the conveyor and the foam solidifes. The region along the conveyor between the points 13a and 13b is referred to as the "foaming region".

If the apparatus as so far described is used to produce foam, friction and adhesion between the foam and the lining papers 5, through the foaming region, results in the convex top surface as explained with reference to FIG. 1. In order to avoid this, according to the present invention there is introduced between the foam and each lining paper 5 a sheet 6 of thin flexible plastic material (e.g. polyethylene) which is drawn from a supply roll 6a located upstream of the conveyor. A pair of pen-like applicators 7 are provided at each side of the conveyor to apply a suitable adhesive to each plastic sheet 6 so that it will adhere initially, but releasably, to the adjacent lining paper 5 and whereby it moves together with the lining paper and is drawn forward and off the supply rolls 6a by the sheet 5. Thus, each plastic sheet 6 moves downstream of the conveyor at the same speed as and in a direction parallel to the conveyor to a first position within the foaming region where there is provided a pair of forceps or grippers 8 which break the releasable adhesive bond between the plastic sheet 6 and lining paper 5 and lift the plastic sheet 6 from the lining paper 5.

Downstream of the forceps or grippers 8, a continuous chain or belt conveyor 9 is provided with forceps 10, which are adapted to grip the upper edge of the plastic sheet 6 and progressively raise the sheet along a path inclined relative to the conveyor as the sheet moves along the conveyor.

To accommodate variations in the rate of foaming, the downstream end of the conveyor 9 can be adjustably raised and lowered, and the entire conveyor 9 can be moved upstream or downstream along the conveyor 1. Thus the path of the plastic sheet 6 can be controlled by adjustment of the conveyor 9 so that the slope of the conveyor 9 corresponds to, or substantially parallels, the slope of the rising upper surface of the foaming material in order that the path of the plastic sheet 6 be properly related to the observed rates of the rising level and forward movement of the foam within the foaming region.

The sheet 6 is released from the forceps 10 at a second position along the conveyor adjacent the downstream end of the foaming region and the sheet thereafter moves downstream with the foam, to which it is adhered, at the same speed as and in a direction parallel to the upper part of the expanded foam. Thus, according to the present invention, the plastic sheets 6 remain in contact with the still tacky foam after completion of foaming in order to avoid damage to the side surfaces of the foam. Of course after the foam has adequately solidified or cured, the plastic sheets 6 can be removed from contact with the side surfaces of the foam without damaging said side surfaces.

In operation, the conveyor 1 moves continuously and the papers 4 and 5 and the plastic sheets 6 are continuously supplied from the supply rolls. The reactants are poured or dispensed by the nozzle 2 onto the conveyor and pass along the conveyor while foaming and polymerization occurs. As the level of the foaming material rises progressively along the conveyor, as shown in FIG. 3 and in FIGS. 4 to 6, the grippers or forceps 8 and the forceps 10 progressively raise the sheets 6 relative to the conveyor between the aforementioned first and second positions so that the upper surface of the foam remains substantially flat and, more important, is substantially flat when foaming and polymerization is completed as shown in FIG. 2. It will be noted that the lower edges of the plastic sheets 6 rise with the foam so that the foam below the sheets comes into contact with the lining papers 5. This is acceptable because it is only necessary to ensure that there is no, or at least no substantial, relative movement between the top surface of the foam and the contiguous surface areas of the plastic sheets.

With the method and apparatus of the invention substantially all of the foam may be sold as rectangular slabs or sheets of the required dimensions.

In a modification, the raising of the plastic sheets 6 relative to the conveyor may be effected by some other mechanical device, instead of using the forceps or grippers 8 and the forceps 10, as for example in the second embodiment of the invention which will now be described.

Referring to FIG. 7, a continuous belt conveyor 101 is driven, in the direction of the arrow, through an end roll 102 from a drive shaft 103. Side boards 104a and 104b are rigidly mounted above the conveyor, the lower edges having clearance from the conveyor surface. The trough so formed is lined with paper which moves with the conveyor, this lining comprising a bottom sheet 105 and two side sheets 106a and 106b constituting side surfaces for confining foam to the conveyor. The sheet 105 is drawn from a supply roll 107 and the sheets 106a and 106b from supply rolls 108a and 108b respectively. As can be seen from the section at the right-hand side of FIG. 7, the sheet 105 extends beneath the side boards 104a and 104b and, furthermore, the lower edges of the side sheets 106a and 106b are folded outwardly under the side boards and lie flat against the edges of the sheet 105. The three sheets together form a paper trough which moves with the conveyor 101 and the overlapped edges of the sheets prevent egress of the initially liquid mixture of reactants. Preferably, adhesive is applied to the margins of the sheet 105 by suitable means (not shown) as it leaves the roll 107 so that a positive seal is made with the underturned edges of the sheets 106a and 106b.

The walls of the paper trough are lined with respective sheets 109a and 109b of flexible and stretchable material, in this case polyethylene film, drawn from supply rolls 110a and 110b respectively. These sheets 109a and 109b constitute lining surfaces for the conveyor and are raised as they move through the foaming region in order to produce a flat upper surface to the foam, as will be described hereinafter. Pen devices, such as 165, apply strips of adhesive to the outer surfaces of the side sheets 106a and 106b, to which the polyethylene sheets 109a and 109b adhere temporarily for support prior to reaching the foaming region. Preferably, the adhesive is of a kind which does not dry or solidify or, at least, does not dry or solidify significantly during the full passage of the polyethylene sheets along the conveyor. Due to this temporary adhesion, the polyethylene sheets are drawn from the supply rolls to the foaming region by the side sheets 106a and 106b. Furthermore, the nondrying or non-solidifying character of the adhesive enables the adhesive bond to be broken subsequently, as will be described, so that neither the polyethylene sheet nor the paper side sheet is damaged and, at a later stage, enables the polyethylene sheet and paper side sheet to be adhesively bonded together again.

Each polyethylene sheet passes from the supply roll, such as 110b, to first guide means constituted by an idler roller assembly including a pair of idler rollers 111a, 111b, then rises along an upwardly inclined path to second guide means constituted by a pinch roll assembly including a pair of driven pinch rolls 112a, 112b located higher from the conveyor than the idler rollers, and then continues down the length of the conveyor. It is to be understood that the foaming region through which the polyethylene sheets are raised is usually further downstream of the conveyor than is indicated in FIG. 7, this distance having been reduced in order to show all the parts in a conveniently sized drawing.

As will be described, means are provided for altering the positions of the idler rollers and the pinch rolls along the conveyor in order to adjust the position at which the polyethylene sheets commence to rise and the rate at which they rise (i.e. the angle of inclination of the path of travel). Also, means are provided for altering the attitudes of the idler rollers and pinch rolls relative to the upper edges of the respective sheets in order to maintain at least the upper parts of the sheets substantially smooth as they travel from the idler rollers to the pinch rolls. Furthermore, means are provided for driving the pinch rolls at a speed such that the sheets are stretched during their travel along the respective upwardly inclined paths. It will be appreciated that the fact that the sheets are being stretched does not necessarily ensure that the sheets are maintained smooth.

A specific production arrangement is shown in the diagrammatic sectional view of FIG. 8, in which the conveyor 101 is inclined at an angle of 6° to the horizontal. The chemical reactants are poured or dispensed onto the trough conveyor from the nozzle of a mixing head 170 which is reciprocated across the conveyor. The liquid reactants move down the conveyor to a position 171 at which significant foaming becomes noticeable and the foam level then rises to a maximum at a position 172 where foaming has ceased and thereafter the foam solidifies as it continues down the conveyor. As will be appreciated, the region between the positions 171 and 172 is the so-called foaming region and within this region the aforementioned idler roller assembly here referenced 111 is located at a first position 173, and the aforementioned pinch roll assembly, here referenced 112, is located at a second position 174.

The polyethylene sheet 109b is drawn from the supply roll 110b and passes parallel to the conveyor to the idler assembly 111, being temporarily supported by adhesive to the side sheet 106b. At the idler assembly 111, the adhesive bond is broken and the polyethylene sheet follows an upwardly inclined path to the pinch roll assembly 112 and thereafter changes direction again so that, at least from the position 172, it moves down the conveyor parallel with the conveyor and in contact with the foam. Although the upper part of the polyethylene sheet is depicted as standing upright after leaving the pinch rolls, in practice this is allowed to fall freely over the edge of the conveyor side. It is important that the lower part of the polyethylene sheet remains in contact with the foam as the foam is still tacky at the position 172 and any attempt to remove the polyethylene sheet at this stage would inevitably damage the side surface and upper edge of the foam. The retention of the lower part of the polyethylene sheet in the desired position at this stage is assisted by the upper strip of adhesive on the lining sheet 106b forming an adhesive bond between the sheet 106b and the polyethylene sheet 109b. When the foam has solidified sufficiently, the polyethylene sheet is removed at a position 175 where, preferably, it is rolled onto a roll 176 together with the paper side sheet.

As already mentioned, the polyethylene sheet is stretched as it travels along the upwardly inclined path. It will be understood that the sheet must travel along this path at a speed which has a component parallel to the conveyor which is the same as the conveyor speed. Consequently, the effective speed along the upwardly inclined path must be greater than the conveyor speed and the additional speed is achieved by stretching the sheet so as to cause elongation of the sheet between the point where the adhesive bond with the side sheet 106b is broken and the pinch rolls 112a, 112b; the pinch rolls being driven at a speed suitably greater than that which would correspond to the conveyor speed. No movement of the sheet, relative to the side sheet 106b, occurs prior to the point where the adhesive bond is broken, as the sheet is sufficiently anchored by the adhesive to the side sheet.

In the event it is desired not to rely on the adhesive bond as an anchor for the stretching action, the idler rollers could be provided with means for partially braking the rollers in order to provide a stretching anchor. Alternatively, a separate pair of vertical rods, or rollers, could be located just upstream of the idler rollers and extending the full height of the polyethylene sheet, the sheet being passed between the rods and anchored thereby for the purpose of the stretching operation.

It is to be understood that the positions 171 to 174 indicated along the conveyor will be different for individual production runs and will vary during a given run, depending on the characteristics of the reactants supplied from the mixing head 170, the speed and width of the conveyor trough, and ambient climatic conditions. Consequently, provision is made for accurate and continuous adjustment of the idler assembly 111 and the pinch roll assembly 112, as will be hereinafter described.

In a specific production run for producing polyether foam, the mixture of reactants supplied by the mixing head 170 consisted of:

|  | parts by weight |
|---|---|
| Polyether Triol (Polypropylene Glycol) (Union Carbide Polyol L-56) | 100.000 |
| Water | 3.200 |
| Triethylene Diamine (DABCO) | 0.100 |
| Silicone Surfactant (Union Carbide L-540) | 1.500 |
| Stannous Octoate — Catalyst (T-9) | 0.200 |
| Tolyene di-Isocyanate (Index 105) | 42.000 |

The output from the mixing head was at the rate of 100 kilograms per minute and the conveyor speed was 4.35 meters per minute. At the time of observation, the foaming was commencing (at position 171) 1.8 meters from the mixing head nozzle at which position the reacting material had a height of 45 millimeters. The length of the foaming region (from position 171 to position 172) was 4.6 meters. From the end of the foaming region, the polyethylene sheet remained in contact with the foam for a further 7.6 meters before being removed (at position 175). The solidified foam was 97 centimeters wide and 80 centimeters high and had a density of 28 kilograms per cubic meter.

Within the foaming region, and again at the time of observation, the idler assembly 111 was position 1.4 meters from the beginning of the foaming region at which position the height of the foam was 34 centimeters. The pinch roll assembly 112 was positioned 2 meters from the idler assembly at which position the height of the foam was 70 centimeters.

It will be noted that the upwardly inclined path of the polyethylene sheet does not extend throughout the whole length of the foaming region. It has been discovered that the foam is sufficiently liquid through the first part of the foaming region that the idler assembly 111 can be positioned some way downstream from the commencement of the foaming region. Observation of various production runs indicate that the upwardly inclined path of the polyethylene sheet should preferably commence between 30 to 40 percent of the length of the foaming region from the beginning of the foaming region. It has also been discovered that the foam becomes sufficiently stable (in the sense of becoming solid) towards the end of the foaming region that the upwardly inclined path of the polyethylene sheet can be terminated some distance before the end of the foaming region and in the example given above the pinch roll assembly is located 1.2 meters upstream from the end of the foaming region. These two factors enable the distance between the idler assembly 111 and the pinch roll assembly 112 to be kept within such limits that the polyethylene sheet can be stretched and maintained completely under control in following the upwardly inclined path determined by the rising level of the foam.

Although the foregoing discussion with reference to FIG. 8 is only in terms of the polyethylene sheet 109b, the same comments apply to the sheet 109a on the opposite side of the trough conveyor.

The details of the idler and pinch roll assemblies and the means for positioning and adjusting them will now be described. Referring again to FIG. 7, two racks 113a and 113b are shown rigidly mounted in alignment with each other on the top edges of the conveyor sides 104a nd 104b respectively. The length of the racks is such that at least the major part of the foaming region at any time will lie within the length of the racks. Each rack carries a saddle unit 114a or 114b including a pair of idler rollers such as 111a, 111b and also a saddle unit 115a or 115b including pinch rolls such as 112a, 112b.

Referring also to FIGS. 9a and 9b, the saddle unit 114b rests on the rack 113b and slides over the rack teeth, being supported against rocking movement by wheels 116 and 117. A projection 118 seats in a channel 119 to retain the saddle unit on the rack. The saddle unit is moved along the rack by a cog 120 driven through bevel gears 121 and 122 from a hand wheel 123. As so far described the other saddle units (114a, 115a and 115b) are similar to the unit 114b and therefore will not be described individually so far as these features are concerned.

In the unit 114b, the idler roller 111a is freely rotatable on a vertical shaft 125 connected to a shaft 126 which extends from a gear box 127. The arrangement of the gear box is such that rotation of a hand wheel 128 causes the shaft 125 to rotate about its axis through a reduced angle relative to the angle of rotation of the wheel 128. The idler roller 111b is freely rotatable on a shaft 129 which is supported in a bracket 132 rigidly secured to the shaft 125. It will be noted that the axis of the idler roller 111b is at an angle with the axis of the idler roller 111a and (referring to FIG. 7) the upper edge 130 of the polyethylene sheet 109b passes behind the roller 111a, between the rollers, and in front of the roller 111b. Thus, due to the angled arrangement of the idler rollers, the polyethylene sheet will be constrained to form a triangular fold or pleat having its apex at the bottom of the sheet. Rotation of the hand wheel 128 to move the idler roller 111b outwardly towards the center of the conveyor, will increase the angle of the pleat, reaching a maximum when the idler roller 111b has moved across the idler roller 111a to lie on the opposite, upstream, side of the roller 111a. This pleat results in the polyethylene sheet leaving the idler rollers in a direction upwardly inclined from the direction at which the sheet arrives at the idler rollers; the angle of inclination depending upon the angle of rotation of the shaft 126. In FIG. 9A, the idler roller 111b lies downstream of the idler 111a and is aligned with the idler 111a relative to the conveying direction. In this attitude, the upward inclination of the polyethylene sheet will be almost negligible. In FIG. 7, the idler roller 111b is shown moved towards the center of the conveyor (say through about 45°) from the position shown in FIG. 9A and the angle of upward inclination of the polyethylene sheet is significant, as indicated by the broken line 130a indicating the lower edge of the sheet. Maximum inclination of the sheet will be achieved when the idler roller 111b is again aligned with the idler roller 111a but lies upstream from the idler 111a.

Saddle unit 114a is similar to unit 114b, except that it does not have a hand wheel 128 and its shaft 126 is rotated through a flexible shaft 135 (FIG. 7) driven from a hand wheel 136 mounted on the saddle unit 114b. Thus, the idler rollers of the two saddle units can be adjusted independently and also from the same side of the conveyor.

Figures 10A, 10B:
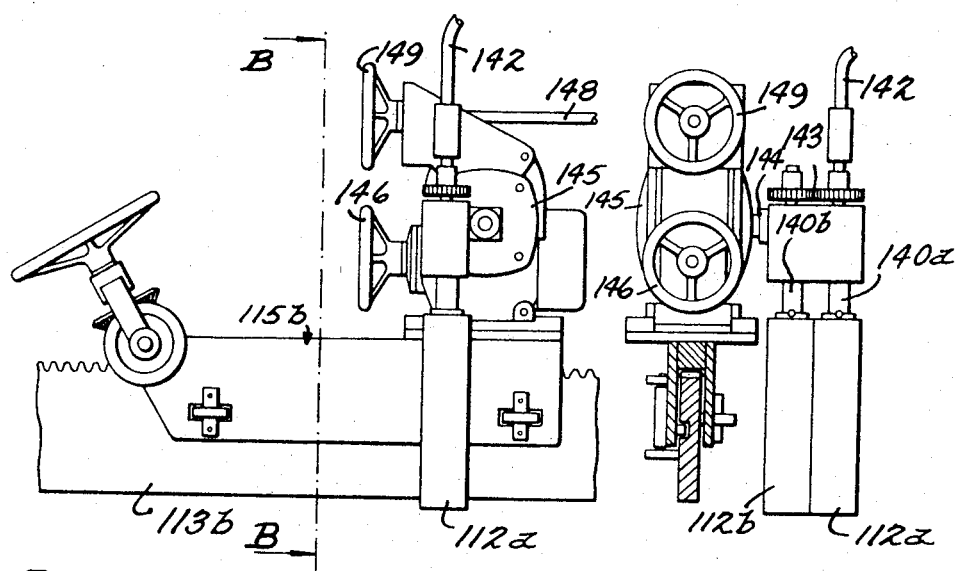
FIG. 10A is a side view of another saddle unit.
FIG. 10B is a cross section on the line B—B of FIG. 10A.

Referring to FIGS. 10A and 10B these show the saddle unit 115b. The pinch rolls 112a and 112b preferably have a rubber surface and are secured on respective shafts 140a and 140b extending downwardly from a bearing box 141. The shaft 140a is driven directly from a flexible shaft 142 and the shaft 140b is coupled through spur gears 143 to the shaft 140a, so that the pinch rolls rotate in opposite directions and so as to pass the polyethylene sheet down the conveyor. The bearing box 141 is carried on a stub shaft 144 extending from a gear box 145 and rotatable about its axis by a hand wheel 146. Thus, by turning the hand wheel 146, the pinch rolls can be swung bodily in a vertical plane either side of an attitude in which they lie perpendicular to the surface of the conveyor belt 101. It has been found that this adjustment facility for the pinch rolls is sufficient to maintain the polyethylene sheet reasonably smooth as it travels upwardly, so as to present a clean uncrumpled surface to the foam. After leaving the pinch rolls, the sheet is left free to travel down the conveyor with the foam, which tends to adhere to the sheet until it has solidified.

The saddle unit 115a is similar in most respects to the unit 115b, but the attitude of its pinch rolls is adjustable through a flexible shaft 148 (FIG. 7) driven from a hand wheel 149 on the saddle unit 115b. Thus, each pair of pinch rolls is independently adjustable in attitude and both pairs can be adjusted from the same side of the conveyor.

Figures 11A, 11B:
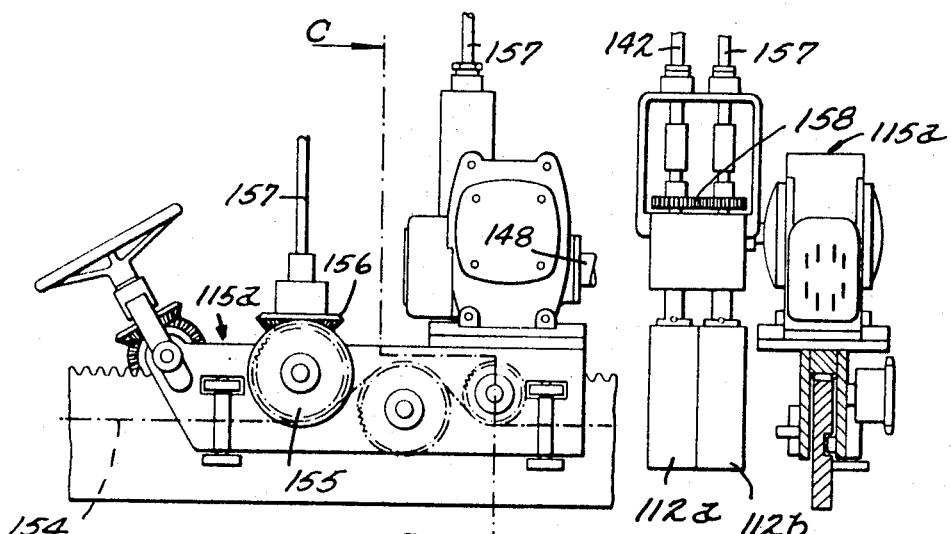
FIG. 11B is a cross section on the line C—C of FIG. 11A.

The drive for the pinch rolls of the saddle units 115a and 115b is derived from the drive shaft 103 of the conveyor. A spur gear fixed to the shaft 103 drives a chain 151 which, through an adjustable ratio gear box 152, a chain 153 and a shaft 153a drives a chain 154. Referring also to FIGS. 11A and 11B the chain 154 engages with a spur gear 155 on the saddle unit 115a which drives a bevel gear 156 which, in turn, drives a flexible shaft 157 connected to the pinch roll 112b of the saddle unit 115a. Also, through spur gears 158, the flexible shaft 157 drives the pinch roll 112a of the saddle member 115a and also the aforementioned flexible shaft 142 from the saddle member 115b. Thus, the speed of rotation of the pinch rolls of both saddle units 115a and 115b is a function of the speed of the conveyor and any alteration in the conveyor speed is reflected in the rotational speed of the pinch rolls. As already described, the pinch rolls are driven at a surface speed which is greater than the conveyor speed and this is achieved by appropriate adjustment of the gear box 152.

Furthermore, it is a feature of the aforedescribed drive arrangement that the speed of rotation of the pinch rolls is appropriately varied, when the saddle units 115a and 115b are moved along their respective racks, in order to ensure that the polyethylene sheets continue to be stretched to the required extent. The chain 154 travels anti-clockwise and inspection of FIG. 7 will show that, when the saddle unit 115a is moved upstream, the spur gear 155 will be rotated clockwise relative to the chain 154 and the resultant rotational speed of the spur gear will be increased by an amount proportional to the speed of the saddle unit. When the saddle unit is moved downstream, the rotational speed of the spur gear will be decreased in proportion to the speed of the saddle unit. Thus, during repositioning of the saddle units, the rotational speed of the pinch rolls varies automatically so that the surface speed of the rolls is maintained substantially constant relative to the conveyor speed.

Although not essential, it is preferred to couple the pairs of saddle units so that each pair can be driven simultaneously by operation of one hand wheel 123 on either side of the conveyor. For this purpose, the bevel gears 122 of the two saddle units 114a and 114b are coupled by a telescopic drive shaft 160. Similarly, the bevel gears of the saddle units 115a and 115b are coupled by a telescopic drive shaft 161.

With the apparatus as described, the saddle units 114a and 114b can be moved in synchronism upstream or downstream of the conveyor in order to position the idler rollers 111a and 111b at the position where the upward path of the polyethylene sheets is to commence. Also, the saddle units 115a and 115b can be positioned in synchronism to place the pinch rolls at the position where the controlled upward path of the sheets is to terminate. The idler rollers can be rotated, by the hand wheel 128, to adjust the angle of inclination of the polyethylene sheet and the attitude of the pinch rolls can be adjusted to hold the sheet reasonably smooth. Also, the attitudes of the pairs of idler rollers and pinch rollers are independently adjustable. With this arrangement, the sheets on each side of the conveyor can be made to travel along paths such that the side regions of the foam are able to rise to the same height as the center region and flat-topped foam is obtained, as indicated at 131 in FIG. 7.

Although the sheets 109a, 109b have been described as polyethylene, it may be preferred to use some other flexible sheet material, and such other material might be a special cloth or crepe paper.

Mentioned has been made of the desirability of avoiding undue spacing between the idlers 111a, 111b and the pinch rolls 112a, and 112b in order that the polyethylene sheets may be maintained stretched and under control. However, this may not be possible with some polymeric foams due to the length of the foaming region, so that the polyethylene sheets may tend to sag even though they are being stretched. In that event, additional pinch rolls similar to the pinch rolls 112a, 112b are provided located along the conveyor midway between the idlers 111a, 111b and the pinch rolls 112a, 112b. The upper edges of the polyethylene sheets are engaged with these further pinch rolls so as to maintain the sheets under control. The pinch rolls may be driven in the manner described with reference to the rolls 112a, 112b or they may be merely idling pinch rolls.

Although the positioning of the saddle units and the adjustment of the attitudes of the idler rollers and pinch rolls have been described in terms of manual control, it is nevertheless envisaged that control could be fully automatic as by electrical control means actuated by one or more transducers for monitoring the height of the top surface of the foam.

What is claimed is:

1. Apparatus for producing a polymeric foam product having a substantially flat upper surface from a foamable reaction mixture comprising in combination: a conveyor arranged to pass said reaction mixture therealong as said reaction mixture expands to produce said polymeric foam product; means for providing a pair of continuous side surfaces arranged to move along the conveyor with the foam and confine the expanding reaction mixture to the conveyor; means for providing continuous lining sheets of thin flexible material adapted to be disposed between said reaction mixture and each of said side surfaces; means for initially moving each of said lining sheets to a first position along the conveyor lying within the upstream portion of the region where foaming takes place with the upper edge portion of each of said lining sheets extending above the upper surface of the foam; means subsequently to move said lining sheets downstream of the conveyor in contact with the side surfaces of the essentially expanded reaction mixture from a second position adjacent the downstream end of the foaming region at the same speed as, and in a direction parallel to, the upper part of the expanded foam; sheet engaging means for engaging, from said first to said second position, the upper edge of each lining sheet to progressively raise and move each of said lining sheets of thin flexible material in contact with the expanding reaction mixture along an upwardly inclined path; and means for adjusting said sheet engaging means so that (a) the position along the conveyor at which the lining sheets begin to rise and (b) the path of each lining sheet corresponds to the rising level and forward movement of the expanding reaction mixture whereby there will be no substantial relative movement between the top surface of the expanding reaction mixture and the contiguous surface areas of said thin flexible lining sheets, so that the resulting expanded foam product will be produced with a substantially flat upper surface and without impairment of the quality of the side surfaces of said expanded foam.

2. Apparatus as claimed in claim 1, wherein the sheet engaging means is operable to stretch at least a part of each lining sheet of thin flexible material during its movement between the first and second positions to prevent relative movement between the top surface of the foam and the contiguous surface areas of said lining sheets.

3. Apparatus as defined in claim 1 which includes stationary side walls and wherein the conveyor comprises a flat conveyor belt adapted to move below the rigid stationary side walls which are located one adjacent each edge of the conveyor belt, said conveyor belt and said stationary side walls being adapted to be lined respectively with sheets of lining material being supplied from supply rolls and being arranged to move continuously with the conveyor belt, the sheet lining the conveyor belt extending under said side walls; and the sheets lining the side walls constituting the side surfaces and having their lower edge folded under said side walls between the side walls and the conveyor belt so that all the sheets of further lining material will form between them a trough which will prevent egress of the reacting materials.

4. Apparatus as claimed in claim 2, wherein the sheet engaging means comprises first sheet guide means located at the vicinity of the upstream end of the foaming region and second sheet guide means located towards the downstream end of the foaming region, said guiding means being adjustable in attitude relative to the upper edge of each sheet so as to maintain at least the upper part of said sheet substantially smooth as it travels along its upwardly inclined path.

5. Apparatus as claimed in claim 4, wherein the first sheet guide means comprises a pair of rollers extending downwardly from above the conveyor and located so that the upper edge of the sheet can be passed between the rollers.

6. Apparatus as defined in claim 4, in which each guiding means is carried by respective transporting means and each said transporting means is independently movable along the conveyor for adjusting the positions of the guiding means relative to the foaming region.

7. Apparatus for producing polymeric foam having a substantially flat upper surface from a mixture of reactants comprising in combination: a conveyor arranged to pass the reactants therealong as they react to produce the foam; means for providing a pair of continuous side surfaces arranged to move along the conveyor with the foam and confine the foam to the conveyor; means for providing continuous sheets of thin flexible material adapted to be disposed between said reactants and each of said side surfaces; means for introducing said sheets in a direction parallel to said conveyor; means for applying adhesive between each said sheet and the respective side surface; means for contacting each sheet with the respective side surface so that said sheets can be adhesively bonded to and move with said side surfaces to a first position along the conveyor lying within the region where foaming takes place, means subsequently to move said sheets downstream of the conveyor from a second position adjacent the downstream end of the foaming region at the same speed as and in a direction parallel to the upper part of the expanded foam, and means for raising said sheets in contact with the foam between the said first and second positions along respective inclined paths which are related to the rising level and forward movement of the foam so that there will be no substantial relative movement between the top surface of the foam and the contiguous surface areas of said sheets; whereby expanded foam can be produced with a substantially flat upper surface.

8. Apparatus as defined in claim 7, which includes means to break the adhesive bond between each sheet and its respective side surface; means to engage the upper part of each said sheet at the first position; and means to lift each sheet thereafter in order to raise the sheet along the inclined path.

9. Apparatus as defined in claim 7 which includes means enabling the angle of inclination of said inclined path to be adjusted in accordance with the rate at which the level of the foam rises.

10. Apparatus for producing polymeric foam from a mixture of reactants comprising in combination: a conveyor arranged to pass the reactants therealong as they react to produce the foam; means for providing side surfaces arranged to move along the conveyor with the foam and confine the foam to the conveyor; means for introducing between said side surfaces and said foam lining surfaces formed by sheets of flexible material which are movable between said side surfaces and the foam; means for moving and controlling each lining surface along a respective upwardly inclined path which substantially corresponds to the rising level and forward movement of the foam; said means for moving and controlling each lining surface including first and second guiding means located respectively adjacent the upstream and downstream ends of the foaming region and engageable with the upper edge of the sheet and adjustable in attitude relative to the upper edge of the sheet so as to maintain at least the upper part of said sheet substantially smooth as it travels along said inclined path; said first guiding means comprising a pair of rollers extending downwardly from above the conveyor and located so that the upper edge of the sheet can pass between said rollers, one roller of the pair being inclined at an angle with respect to the other roller of said pair, and means for moving said one roller bodily about said other roller of said pair so as to form a triangular pleat such that the sheet is guided to travel along said upwardly inclined path after leaving said first guiding means; means for adjusting the positions of said first and second guiding means relative to said foaming region; and means for subjecting said lining surfaces to a stretching action tending to elongate at least a part of each lining surface as it is moved through the region where foaming takes place so that there is no substantial relative movement between the top surfaces of the foam and the lining surfaces from the point where said lining surfaces start to rise until the foam has solidified sufficiently to allow the lining surfaces to be removed from the foam without substantial damage.

11. Apparatus as defined in claim 10, wherein the rollers are idler rollers.

12. Apparatus for producing polymeric foam from a mixture of reactants comprising in combination: a conveyor arranged to pass the reactants therealong as they react to produce the foam; means for providing side surfaces arranged to move along the conveyor with the foam and confine the foam to the conveyor; means for introducing between said side surfaces and said foam lining surfaces formed by sheets of flexible material which are movable between said side surfaces and the foam; means for moving and controlling each lining surface along a respective upwardly inclined path which substantially corresponds to the rising level and forward movement of the foam; said means for moving and controlling each lining surface including first and second guiding means located respectively adjacent the upstream and downstream ends of the foaming region and engageable with the upper edge of the sheet, and adjustable in attitude relative to the upper edge of the sheet so as to maintain at least the upper part of said sheet substantially smooth as it travels along said inclined path, said second guiding means comprising a pair of driven pinch rolls extending downwardly from above the conveyor and located so that the upper edge of the sheet can pass between said pinch rolls; means for adjusting the positions of said first and second guiding means relative to said foaming region; and means for driving said pinch rolls at a surface speed which is greater than the conveyor speed in order to subject said lining surfaces to a stretching action tending to elongate at least a part of each lining surface as it is moved through the region where foaming takes place so that there is no substantial relative movement between the top surfaces of the foam and the lining surfaces from the point where said lining surfaces start to rise until the foam has solidified sufficiently to allow the lining surfaces to be removed from the foam without substantial damage.

13. Apparatus as defined in claim 12, which includes means for rotating the pinch rolls in a vertical plane including the sheet about a point lying above the upper ends of said pinch rolls.

14. Apparatus as defined in claim 12, in which the means for driving the pinch rolls is driven from a drive for the conveyor.

15. Apparatus as claimed in claim 14, in which the means for driving the pinch rolls includes means for automatically varying the rotational speed of the pinch rolls when the position of the latter is adjusted relative to the foaming region, so that the surface speed of the pinch rolls relative to the conveyor speed is maintained substantially constant.

16. Apparatus as defined in claim 15, comprising third sheet guiding means located between said first and second sheet guiding means.

17. Apparatus as defined in claim 16, wherein the third sheet guiding means comprise a pair of further rollers extending downwardly from above the conveyor and located so that the upper edge of the sheet can be passed between said further rollers.

18. Apparatus as defined in claim 17, which includes means for rotating the further rollers of the third sheet guiding means in a vertical plane including the sheet about a point lying above the upper ends of said further rollers.

19. Apparatus as defined in claim 17, wherein the further rollers of the third sheet guiding means are driven pinch rolls.

20. Apparatus for producing polymeric foam from a mixture of reactants comprising in combination: a conveyor arranged to pass the reactants therealong as they react to produce the foam; means for providing side surfaces arranged to move along the conveyor with the foam and confine the foam to the conveyor; means for introducing between said side surfaces and said foam lining surfaces formed by sheets of flexible material which are movable between said side surfaces and the foam; means for moving and controlling each lining surface along a respective upwardly inclined path which substantially corresponds to the rising level and forward movement of the foam; said means for moving and controlling each lining surface including first and second guiding means located respectively adjacent the upstream and downstream ends of the foaming region and engageable with the upper edge of the sheet, and adjustable in attitude relative to the upper edge of the sheet so as to maintain at least the upper part of said sheet substantially smooth as it travels along said inclined path; each of said guiding means being carried by a saddle unit; a pair of racks, one along each side of said conveyor mounting the saddle units, and means individual to each saddle unit for engaging said racks for driving the saddle units along their respective racks for adjusting the positions of said first and second guiding means relative to said foaming region; and means for subjecting said lining surfaces to a stretching action tending to elongate at least a part of each lining surface as it is moved through the region where foaming takes place so that there is no substantial relative movement between the top surfaces of the foam and the lining surfaces from the point where said lining surfaces start to rise until the foam has solidified sufficiently to allow the lining surfaces to be removed from the foam without substantial damage.

21. Apparatus as defined in claim 20, in which the means for driving the saddle units on each side of the conveyor carrying the first guide means are coupled together so that said saddle units move in unison.

22. Apparatus as defined in claim 20, in which the means for driving the saddle units on each side of the conveyor carrying the second guide means are coupled together so that said saddle units move in unison.

* * * * *

UNITED STATES PATENT OFFICE
CERTIFICATE OF CORRECTION

Patent No. 3,751,197          Dated August 7, 1973

Inventor(s)   Nicholas George Petzetakis

It is certified that error appears in the above-identified patent and that said Letters Patent are hereby corrected as shown below:

In the Heading:

The inventor's name should read --Nicholas George Petzetakis--.

The assignee should read  -- Unifoam A. G., Glarus, Switzerland --

Please add --Claims priority, application Greece 31,732, filed November 12, 1965 and application Greece 35,300, filed July 1, 1967.--

Col. 2, line 12, "impar-" should read --impart--.
Col. 3, line 48, "FIG 11" should read --FIG 11A--.
Col. 4, line 12, "difes" should read --difies--.
Col. 8, line 52, "nd" should read --and--.
Col. 11, line 3, "rollers" should read --rolls--.
Col. 11, line 13, "mentioned" should read --mention--.

Signed and sealed this 19th day of November 1974.

(SEAL)
Attest:

McCOY M. GIBSON JR.
Attesting Officer

C. MARSHALL DANN
Commissioner of Patents